United States Patent [19]

Fox

[11] Patent Number: 4,890,654
[45] Date of Patent: Jan. 2, 1990

[54] BAND SAW ATTACHMENT FOR MULTIPURPOSE POWER TOOL

[75] Inventor: Anthony Fox, Bloomington, Minn.

[73] Assignee: TFC Corporation, Bloomington, Minn.

[21] Appl. No.: 315,932

[22] Filed: Feb. 27, 1989

[51] Int. Cl.$^4$ .................... B27C 9/02; B23P 23/02; B23Q 1/14

[52] U.S. Cl. .................... 144/1 D; 29/27 A; 144/1 C

[58] Field of Search .................... 29/26 A, 27 A, 560; 144/1 R, 1 C, 1 D, 35 R, 35 A

[56] References Cited

U.S. PATENT DOCUMENTS

| | | | |
|---|---|---|---|
| 1,973,409 | 9/1934 | Evinrude | 144/1 D |
| 2,619,135 | 11/1952 | Callaway | 29/27 P |
| 2,627,288 | 2/1953 | Steiner | 144/1 D |
| 4,318,432 | 3/1982 | Howey | 144/1 C |
| 4,349,945 | 9/1982 | Fox | 29/27 A |
| 4,566,510 | 1/1986 | Bartlett et al. | 144/1 C |

Primary Examiner—W. Donald Bray
Attorney, Agent, or Firm—Haugen and Nikolai

[57] ABSTRACT

A specially designed band saw is provided as an accessory attachment to a multipurpose power tool assembly described in U.S. Pat. No. 4,349,945. The band saw may be mounted on the same bench surface as the multipurpose power tool itself and a tubular coupler is used to join the power take-off shaft of the multipurpose power tool to the band saw's drive shaft such that the same drive motor used for the multipurpose power tool can also proivde power to the band saw.

5 Claims, 3 Drawing Sheets

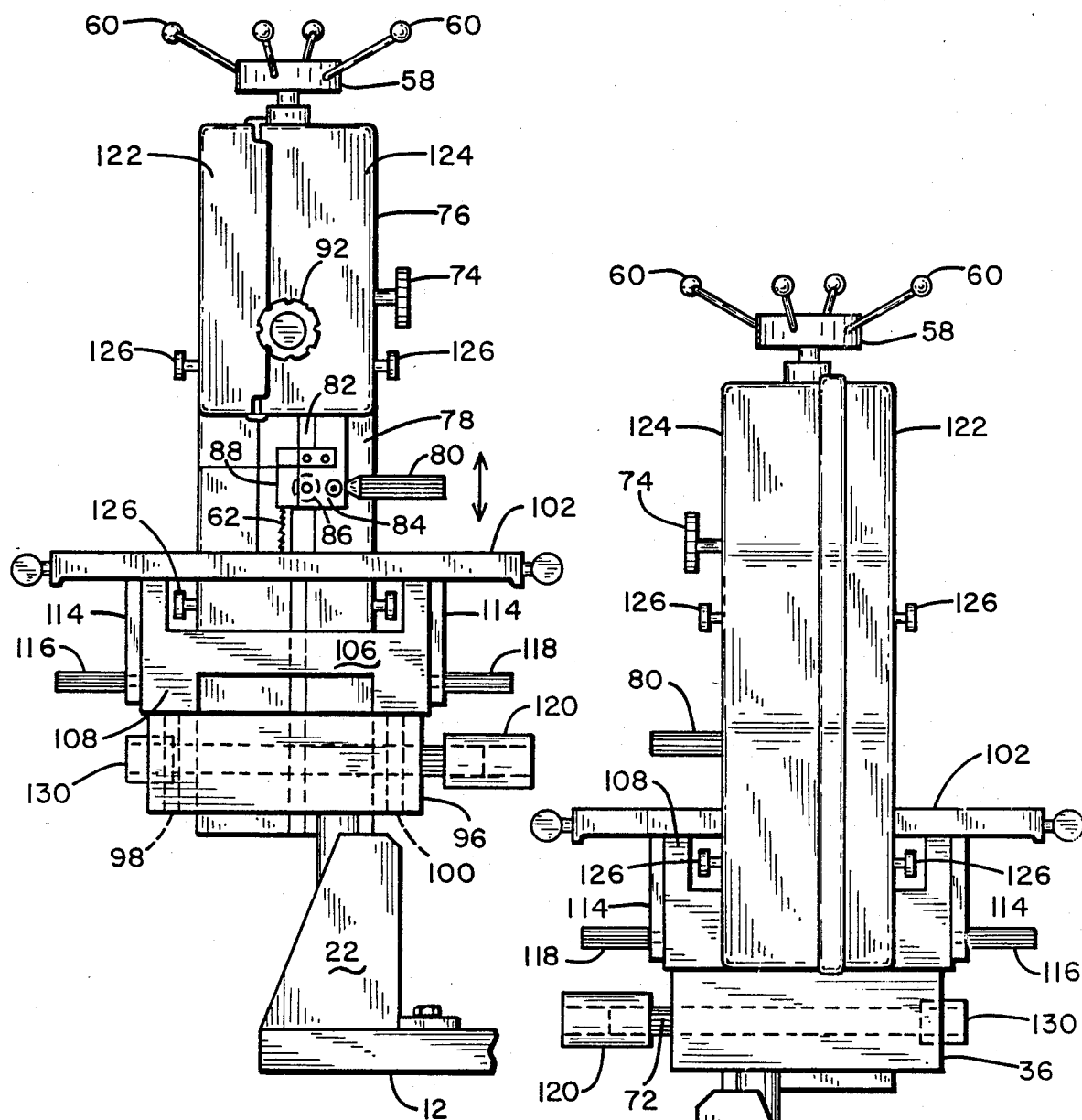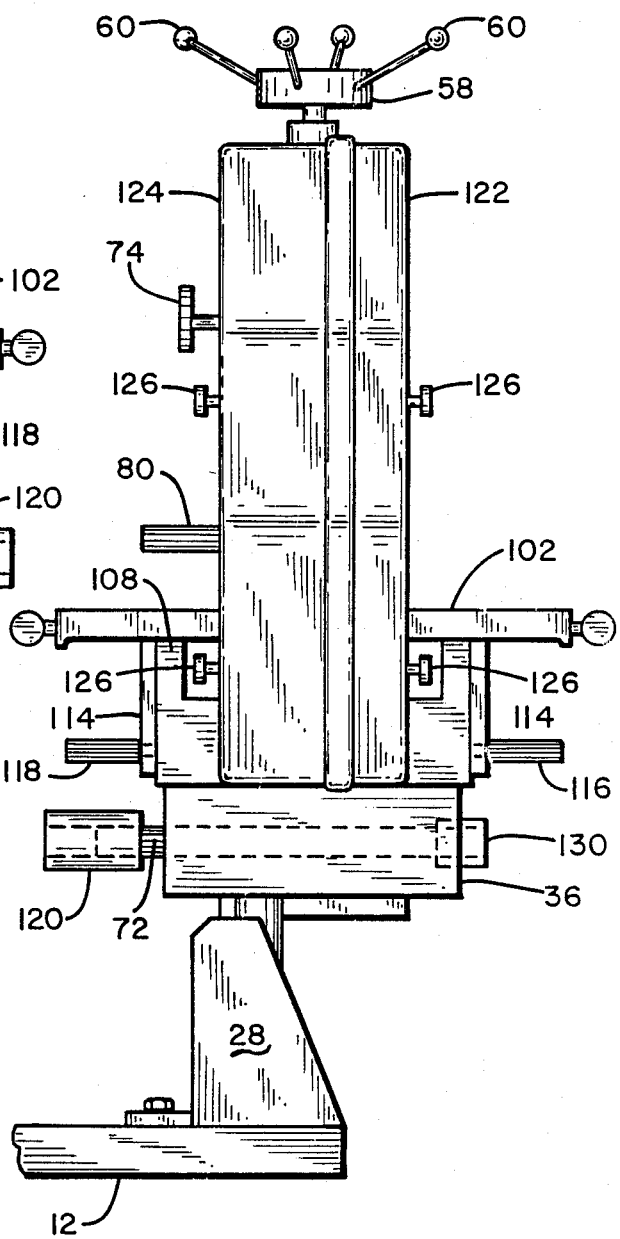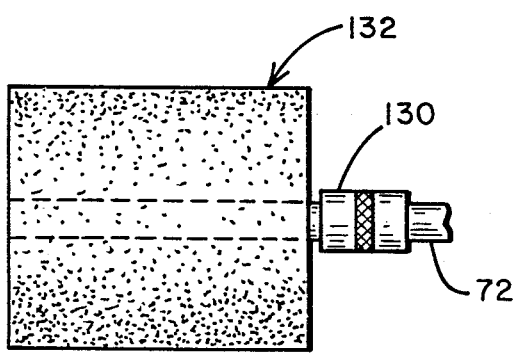

BAND SAW ATTACHMENT FOR MULTIPURPOSE POWER TOOL

BACKGROUND OF THE INVENTION

I. Field of the Invention

This invention relates generally to a multipurpose shop tool which is convertible to perform a variety of wood/metal working operations and more particularly to the design of a band saw as an optional attachment for such multipurpose power tool.

II. Discussion of the Prior Art

In applicant's earlier U.S. Pat. No. 4,349,945, there is described the construction and operational features of a multipurpose power tool which can readily be converted to perform a wide variety of operations on a workpiece including drilling, shaping, routing, sanding, sawing, turning, and milling. Although the power tool assembly described in the aforereferenced patent is extremely versatile, it is limited in the type of cuts that can be made in a sawing operation. Thus, it has been necessary in the past to have a separate band saw in the suite of equipment in a well furnished shop, such a band saw having its own support stand and motor.

SUMMARY OF THE INVENTION

The present invention is directed to an auxiliary attachment for the multipurpose power tool in the form of a band saw which can readily be mounted on one end of the bench supporting the multipurpose power tool and specially designed so that a coupling tube may be used to join the power take-off shaft of the multipurpose power tool to the drive shaft of the band saw. This makes it unnecessary to have a separate motor drive for the band saw while allowing both pieces of equipment to be driven simultaneously.

The foregoing features, objects and advantages of the present invention will become apparent to those skilled in the art from the following detailed description of the preferred embodiment, especially when considered in conjunction with the accompanying drawings in which like numerals in the several views refer to corresponding parts.

DESCRIPTION OF THE DRAWINGS

FIG. 2 is a front view of the band saw in accordance with the present invention.

FIG. 4 is a left side view of the band saw in accordance with the present invention.

FIG. 5 shows how additional rotary tools may be coupled to the drive shaft of the band saw.

DESCRIPTION OF THE PREFERRED EMBODIMENT

Figure 1:
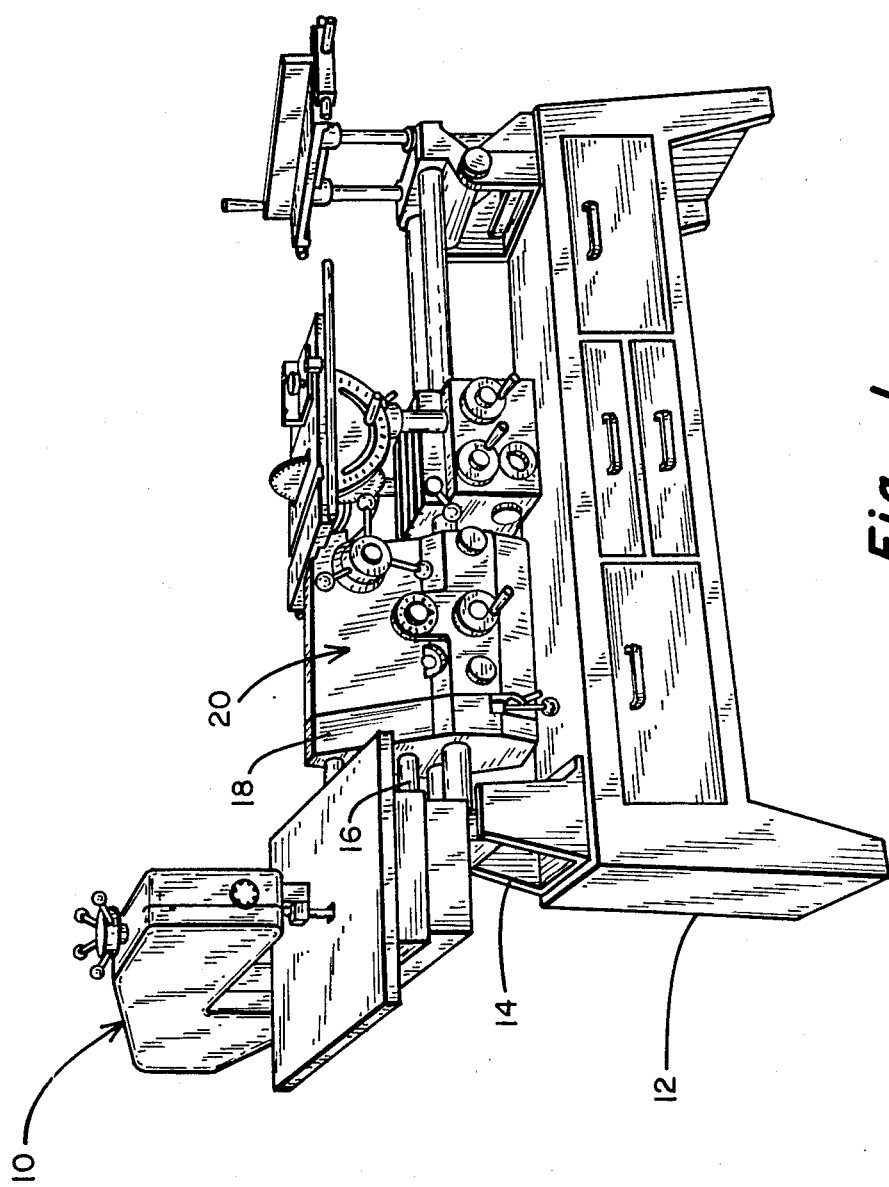
FIG. 1 is a pictorial view showing the band saw of the present invention mounted as an optional accessory to a multipurpose power shop tool.

Referring first to FIG. 1, there is shown a perspective view of the multipurpose power tool with which the band saw of the present invention is designed to be used. In that this machine is fully described in U.S. Pat. No. 4,349,945, there is no need to describe it further here other than to say that the bench 12 is extended beyond the support pedestal 14 to provide a surface upon which the band saw of the present invention may be affixed. The opening 16 formed in the belt transmission cover 18 on the power head 20 allows access to a power takeoff shaft having a splined exterior surface (not shown).

Referring next to FIG. 2, there is shown attached to the upper surface of the bench 12 a band saw mounting pedestal 22 which is preferably cast aluminum and which extends across the width dimension of the bench 12. Bolts as at 24 hold it in place. Integrally formed with the sides 26 and 28 of the pedestal 22 are block members 30 and 32 each having a vertical bore 34 formed therethrough for receiving cylindrical posts (not shown) projecting vertically downward from the band saw's transmission housing block 36. To firmly lock the removable band saw in place on the pedestal, there is provided a knurled cylinder 38 which extends between the blocks 30 and 32 and which has threaded ends thereon. By rotating the rod 38, pressure may be applied or released from the posts.

Figure 3:
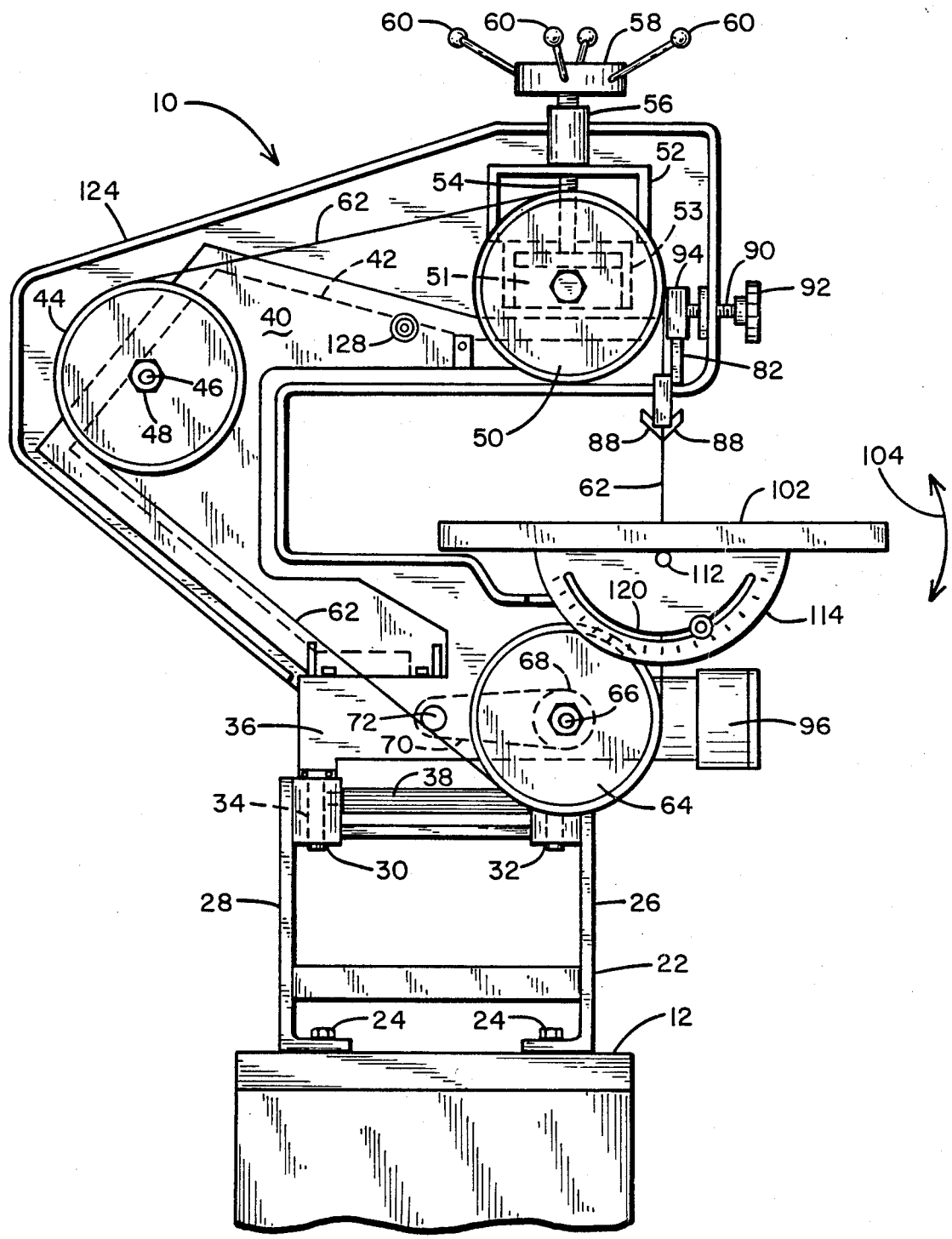
FIG. 3 is a right side view of the band saw of the present invention.

In FIG. 3, the band saw, indicated generally by numeral 10, is shown with its front panel removed to reveal the inner working parts thereof. Affixed to the upper surface of the transmission housing block 36 is a support plate 40 which is generally C-shaped to define the throat portion of the band saw. The throat preferably has a depth of about 20 inches. Welded to the opposite or rear side of the support plate 40 around its perimeter is a reinforcing member 42 in the form of a steel tube of rectangular cross-section.

Also attached to the support plate 40 is a bearing block (not shown) in which the saw blade idler wheel 44 is journaled. The wheel 44 is held in place on its shaft 46 by a nut 48. An upper saw blade idler wheel 50 is journaled for rotation in a bearing block 51 supported by a rectangular yoke member 52 which serves as a guide support for a frame 53 in which the bearing block 51 is suspended. A lead screw 54 passes through a cylindrical spacer 56 and an aperture formed in the upper surface of the yoke 52. A knob member 58 is affixed to the upper end of the lead screw and handles 60 are provided to permit the operator to readily rotate the knob 58. In doing so, the upper wheel assembly 50 and its supporting bearing block 51 can be raised or lowered to thereby alter the tension on the band saw blade 62. It has also been found convenient to provide a suitable indicator on the lead screw 54 just above the top of the collar 56 for informing the operator what tension should be applied to saw bands of differing width dimensions. For example, by providing painted rings of three different colors along the screw shaft 54, the operator can be made aware of how many turns should be given to the knob 58 to accommodate saw bands of ¾ inch, ½ inch, or ¼ inch dimension.

The band saw drive wheel 64 is journaled for rotation in bearings disposed in the transmission block 36. With continued reference to FIG. 3, affixed to the shaft 66 of the drive wheel 64 is a belt pulley 68 of a first diameter and surrounding it is a V-belt 70 which, in turn, is entrained about a pulley of a lesser diameter affixed to the band saw's drive shaft 72.

While not clearly shown in the front view of FIG. 3, the periphery of each of the band saw guide wheels 44, 50 and 64 is surrounded by a resilient rubberized surface which serves to prevent lateral shifting of the blade when the tension of the blade is appropriately adjusted. That is, the rubberized surface, being somewhat resilient, will deform under the tension forces exerted by the blade, precluding lateral movement.

Referring next to FIG. 2, shown there is a knob 74 which has a shaft pass through a slot formed in the molded plastic cover 76. This shaft is appropriately threaded to cooperate with the journal bearing block 51 for the upper guide wheel 50 and provides a means whereby the blade 62 may be precisely aligned in a vertical plane passing through each of the three guide wheels.

Still with reference to FIG. 2, there is shown a blade back-up and workpiece hold down assembly indicated generally by numeral 78. It includes a handle 80 affixed to a vertical slide rod 82. Attached to the lower end of the slide rod 82 is a bifurcated bracket 84 and between the arms of the bifurcated bracket is a roller member 86 whose periphery is positioned in close but non-contact relationship to the non-serrated edge of the blade 62. When a workpiece to be cut is pushed into the blade, the roller serves as a back-up to prevent undue stress on the blade which might result in breakage. The blade also passes between two angled guides 88 which come together to form a V, a blade passing through the apex thereof. In order to adjust and lock the blade back-up and guide assembly 78 at a desired height, a clamping screw 90 on the end of a knob 92 passes into a channel 94 through which the slide bar 82 also passes.

As shown in FIG. 3, there is attached to the right side of the transmission housing 36 a support bar 96 having first and second cylindrical bores 98 and 100 passing through the thickness dimension thereof near opposed ends. The saw table 102 is disposed in the throat of the band saw and is pivotally supported for rotation about a horizontal axis as indicated by the double-headed arrow 104 in the front view of FIG. 3. More particularly, and with reference again to FIG. 2, a table support 106 has a pair of cylindrical posts projecting from the undersurface of the integrally formed blocks 108 and 110, those cylindrical posts fitting with close tolerance within the vertical bores 98 and 100 formed in the support bar 96. This allows the table height to be adjusted up and down and, in the event of belt breakage, the table can be readily lifted and removed to provide better access to the guides through which the saw band must pass so that a replacement blade can be installed.

Pivot pins 112 (FIG. 3) on each side of the member 106 pass through the table guide member 114 and knurled handles 116 and 118 pass through an arcuate slot 120 formed in the table guides 114. When the handles are screwed to their loosened position, the table may be tilted to a desired angle for cutting a beveled edge on a workpiece and the angle can then be maintained by again tightening the handles to clamp the table. When the handles 116 and 118 are tight, they also press against the vertical posts within the bores 98 and 100 and prevent the table from being lifted off from the band saw.

FIG. 4 is a left end view of the band saw of the present invention. There is shown entering the side of the transmission housing 36 the drive shaft 72. The shaft is splined to cooperate with grooves formed on the internal surface of the power take-off coupler 120 which, in its simplest form, comprises a Nylon sleeve surrounding a portion of the drive shaft 72 and adapted to also receive a splined shaft coming from the power take-off point 16 of the multipurpose power tool illustrated in FIG. 1. As such, the band saw receives its drive power from the motor embodied in the multipurpose power tool.

It should also be obvious to persons skilled in the art that the band saw of the present invention may be mounted on its own independent stand and then be provided with its own motor and thus used independently of its multipurpose power tool shown in FIG. 1.

Moreover, by providing three blade guide wheels 44, 50 and 64 arranged as shown, a relatively large throat can be provided, e.g., up to 20 inches or more. In some band saws only an upper and lower guide wheel is provided which limits the throat dimension to the wheel diameter of the smallest of the two wheels. When desired, however, a shorter band may be used with the saw of the present invention by having it surround only the drive wheel 54 and the upper idler wheel 50.

The view of FIG. 4 also shows the band saw with its front and rear guard panels 122 and 124 in position so as to totally enclose the blade guide wheels and the blade itself except where it passes through the throat of the band saw. The front and rear guards 122 and 124 are held in place by suitable fasteners such as bolts 126, having gripping knobs affixed thereto, passing into internally threaded tubular stubs, one of each is shown in the front view of FIG. 3 and identified by numeral 128. The threaded posts 128 are welded to the V-shaped support plate 40 as shown.

By extending the band saw's drive shaft 72 through and beyond the transmission housing block 36 and by attaching a Morris taper R8 quick release coupler 130 to the left end of that shaft when viewed as in FIG. 2, it also becomes possible to simultaneously drive other materials finishing tools from the motor (not shown) contained within the power head 20. For example, as shown in FIG. 5, a drum sander attachment 132 can be fitted into the quick release Morris taper 130. While for purposes of example, a drum sander is illustrated in FIG. 5, those skilled in the art will readily understand that a disc sander or other type of rotating tool may be releasibly attached to the drive shaft 72 so as to be driven thereby. Moreover, suitable guards and workpiece rests may be fixed to the transmission housing block 36 and out through the side of the guard panel 122 to cooperate with the rotary tool.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to equipment details and operating procedures, can be accomplished without departing from the scope of the invention itself.

What is claimed is:

1. In the multipurpose power tool of the type including an elongated bench having a first pedestal attached to said bench at one end thereof and a second pedestal attached to said bench at a location intermediate said one end and the opposed end thereof, a pair of spaced, parallel elongated tubular ways, pivotally secured at one end of each to said first pedestal for rotation between a horizontal disposition and a vertical disposition; a power head assembly attached to said pair of tubular ways for axial movement therealong, said power head assembly including motor means disposed therein for driving a spindle assembly and including a power take-off shaft, a band saw attachment for said multipurpose power tool comprising:

(a) a third pedestal attached to said bench proximate said opposed end thereof;

(b) a transmission housing removably affixed to said third pedestal, said transmission housing including means for journaling a drive shaft and a blade band drive wheel therein, said drive shaft and blade band drive wheel being coupled together by belt and pulley means;

(c) A generally C-shaped support plate fixedly attached to said transmission housing and extending vertically upward therefrom;

(d) first and second blade band idler wheels journaled for rotation in a vertical plane on said support plate, one of said idler wheels being vertically aligned with said blade band drive wheel and said other idler wheel being laterally offset to define a throat zone;

(e) a saw table support affixed to said transmission housing;

(f) a saw table removably coupled to said saw table support and disposed in said throat zone;

(g) a band saw blade surrounding said blade band drive wheels and said first and second blade band idler wheels with one flight of said blade passing vertically through said saw table; and (h) coupler means for removably coupling said drive shaft to said power take-off shaft when said power head assembly is positioned proximate said second pedestal.

2. A band saw attachment as in claim 1 and further including means coupled to said one of said band idler wheel for adjusting the tension of said band saw blade.

3. The band saw attachment as in claim 1 and further including a blade guide attached to said support plate, said blade guide including a blade back-up roller, said blade guide being affixed to said support plate for vertical positioning along said one flight.

4. A band saw attachment as in claim 1 wherein said saw table is pivotable within said throat zone about a horizontal axis.

5. A band saw as in claim 1 and further including front and rear cover members removably joined to said support plate for enclosing said band blade drive wheel, said band blade idler wheels and all of said blade except said vertical flight.

* * * * *